United States Patent [19]
Kaneko et al.

[11] Patent Number: 6,130,816
[45] Date of Patent: Oct. 10, 2000

[54] ELECTRIC DISCHARGE MACHINING APPARATUS

[75] Inventors: Yuji Kaneko, Kanagawa; Yoshihiro Watanabe, Yokohama, both of Japan

[73] Assignee: Sodick Co., Ltd., Kanagawa, Japan

[21] Appl. No.: 09/239,534

[22] Filed: Jan. 29, 1999

[30] Foreign Application Priority Data

Feb. 3, 1998 [JP] Japan .................................. 10-035377

[51] Int. Cl.$^7$ ..................................................... B23H 1/00
[52] U.S. Cl. ........................................... 361/234; 361/115
[58] Field of Search ............................... 361/234, 18, 56, 361/115, 2, 3, 5, 13

[56] References Cited

U.S. PATENT DOCUMENTS 5,352,859 10/1994 Kaneko et al. ....................... 219/69.13

*Primary Examiner*—Stephen W. Jackson

*Attorney, Agent, or Firm*—Paul Devinsky; McDermott, Will & Emery

[57] ABSTRACT

An electric discharge machining apparatus for machining a workpiece by supplying a series of voltage pulses to a machining gap formed between the workpiece being machined and a tool electrode, comprises a machining power supply for supplying voltage to the machine gap; a switching transistor connected between the machining power supply and the machining gap for pulsing the output voltage of the machining power supply; a gate pulse generator is provided for generating a gate pulse signal having an ON time and an OFF time to control on/off switching operation of the switching transistor so that switching transistor is in non-conducting state when the gate pulse signal is OFF, a monitoring power supply is connected in parallel with the switching transistor, and; a faulty transistor determination circuit is provided which determines if a switching transistor has failed when current flows from the monitoring power supply through the switching transistor even though the gate pulse signal is OFF.

6 Claims, 5 Drawing Sheets

ELECTRIC DISCHARGE MACHINING APPARATUS

FIELD OF THE INVENTION

The present invention generally relates to an electric discharge machining apparatus for machining a workpiece by supplying a series of voltage pulses to a machining gap formed between the workpiece being machined and a tool electrode. In particular, the present invention relates to an electric discharge machining apparatus in which a switching transistor is connected between a machining power supply and the machining gap to produce a high frequency pulsed output voltage from a d.c. power supply.

BACKGROUND OF THE INVENTION

In an electric discharge machine, a series of voltage pulses are applied across a space, called "a machining gap," formed between the workpiece being machined and a tool electrode to intermittently generate an electric discharge thereacross. The use of a bipolar type switching transistor, or a MOSFET type switching transistor, for pulsing the output voltage of a d.c. power supply at controlled high frequency is known. If the switching transistor fails during machining, its faulty operation may result in the flow of an overcurrent through a machining gap, which in turn may damage the workpiece being machined or cause the breakage of the wire electrode. Overheating and any conductive dust which happens to attach to the transistor circuit are possible causes such faulty operation.

Japanese Laid-Open Patent 61-111821 discloses an electric discharge machine in which a power supply is cut off when overcurrent flowing through the switching transistor is detected by a fuse or a coil.

SUMMARY OF THE INVENTION

An object of the present invention is to provide an electrical discharge machining apparatus in which a faulty switching transistor can be checked without damage to the workpiece due to overcurrent.

Another object of the present invention is to provide an electrical discharge machining apparatus in which when it is determined that the switching transistor has failed, no immediate repair of the faulty switching transistor is needed.

Another object of the present invention is to provide an electrical discharge machining apparatus which will reliably and immediately determine when a switching transistor has failed.

In order to achieve the above and other objectives, an electric discharge machining apparatus according to the present invention, for machining a workpiece by supplying a series of voltage pulses to a machining gap formed between the workpiece being machined and a tool electrode, may comprise:
- a machining power supply for supplying a voltage to the machining gap;
- a switching transistor connected between the machining power supply and the machining gap for pulsing the output voltage of the machining power supply;
- a gate pulse generator for generating a gate pulse signal having an ON time and an OFF time to control on/off switching operation of the switching transistor so that switching transistor is in non-conducting state when the gate pulse signal is OFF,
- a power supply monitoring circuit connected in parallel with the switching transistor, and;
- a faulty transistor detection circuit which determines if a switching transistor has failed by sensing when current flows from the power supply monitoring circuit through the switching transistor even though the gate pulse signal is OFF.

Moreover, an electric discharge machining apparatus according to an aspect of the present invention, for machining a workpiece by supplying a series of voltage pulses to a machining gap formed between the workpiece being machined and a tool electrode, may comprise:
- a machining power supply for supplying a voltage to the machining gap;
- a switching transistor connected between the machining power supply and the machining gap for pulsing the output voltage of the machining power supply;
- a gate pulse generator for generating a gate pulse signal having an ON time and an OFF time to control on/off switching operation of the switching transistor so that switching transistor is in conducting state when the gate pulse signal is ON,
- a power supply monitoring circuit connected in parallel with the switching transistor, and;
- a faulty transistor detection circuit which determines if a switching transistor has failed by sensing when no current flows from the power supply monitoring circuit through the switching transistor even though the gate pulse signal is ON.

Also, an electric discharge machining apparatus according to an aspect of the present invention, for machining a workpiece by supplying a series of voltage pulses to a machining gap formed between the workpiece being machined and a tool electrode, may comprise:
- a machining power supply for supplying a voltage to the machining gap;
- a starting switching transistor;
- a spare switching transistor;
- a switch device for selectively connecting one of the two switching transistors between the machining power supply and the machining gap for pulsing the output voltage of the machining power supply;
- a faulty transistor detection circuit for determining if a starting switching transistor has failed, and;
- a switch controller for controlling the switch device so that when the faulty transistor detection circuit determines that the starting switching transistor has failed, the starting switching transistor is cut off and a spare transistor is connected between the machining power supply and the machining gap.

Other objects of the present invention will be discussed in the explanation which follows, or will be become apparent to practitioners of the art through implementation of the invention.

PREFERRED EMBODIMENT OF THE INVENTION

Figure 1:
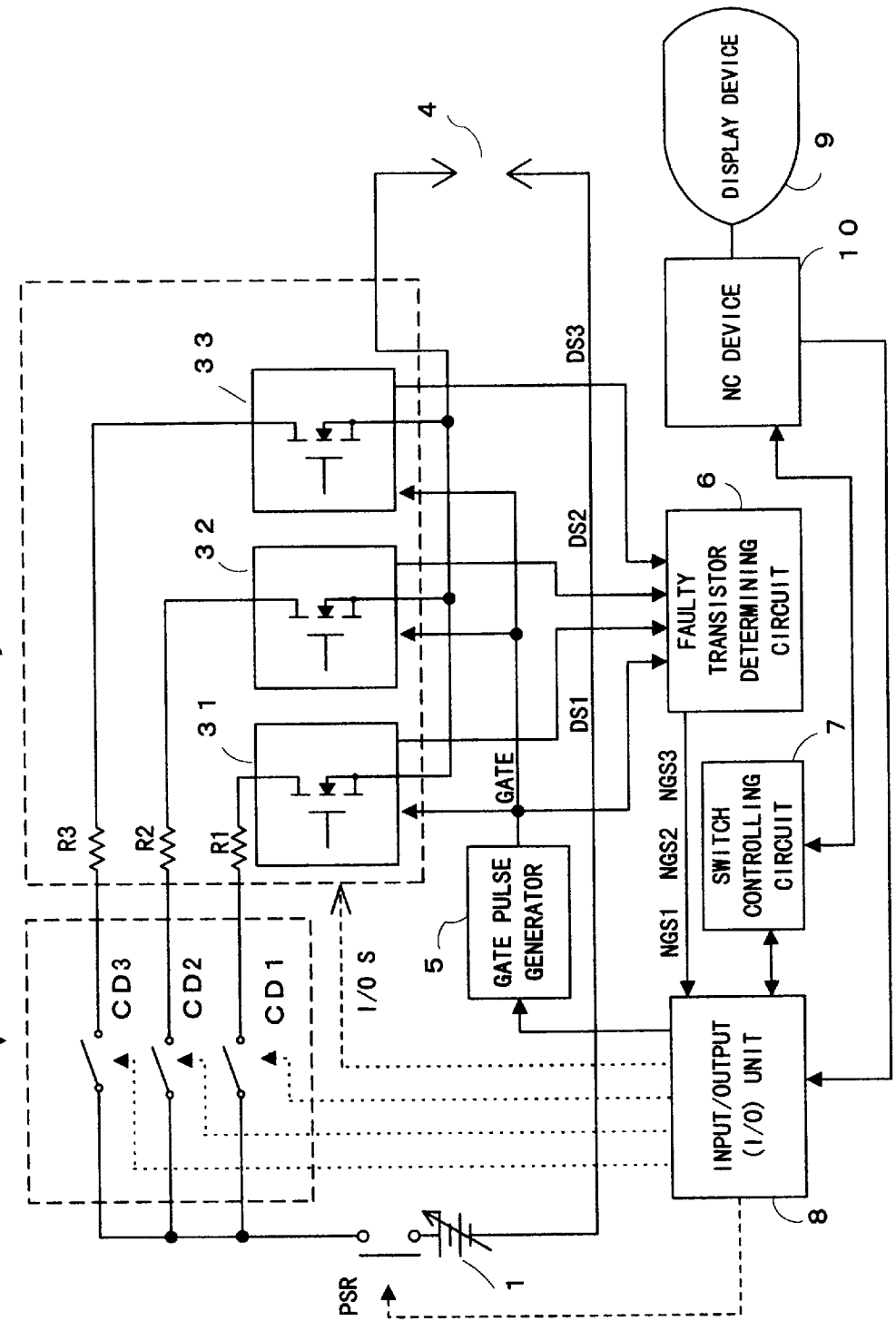
FIG. 1 is a block diagram illustrating an electric discharge machining apparatus in accordance with the present invention.

An electric discharge machining apparatus of the present invention will now be described with reference to FIG. 1.

Reference numeral 4 denotes a spacing, known as the "machining gap," formed between the workpiece W and a tool electrode E. An electric discharge machining apparatus includes a variable-voltage, d.c. power supply 1, a switch unit 2, and a switching transistor unit 3 which is provided between the d.c. power supply 1 and the machining gap 4 for pulsing the power of the d.c. power supply 1 by its high frequency on/off switching operation. The switching transistor unit 3 comprises a starting switching transistor 31 and spare switching transistors, 32 and 33 which are connected in parallel between the d.c. power supply 1 and the machining gap 4, and connected to respective switches CD1, CD2 and CD3 of the switch unit 2. Reference numerals R1, R2 and R3 symbolically denote line impedance. The switch unit 2 is a switch circuit which uses relays and which comprises three switches CD1, CD2 and CD3 for selectively connecting the switching transistors circuit 31, 32 and 33 to the d.c. power supply 1. An electromagnetic switch PSR, which is closed during machining, is connected between the d.c. power supply 1 and the switch unit 2.

The electric discharge machining apparatus further includes a gate pulse generator 5, an NC device 10, a display device 9, such as a cathode-ray tube and/or a liquid crystal display, and a switch controlling circuit 7, preferably comprising a microcomputer. The gate pulse generator 5 generates a gate pulse signal GATE to control the conduction state of each of the switching transistor circuits 31, 32 and 33. The NC device 10 is connected to the switch controlling circuit 7 and the display device 9, and, via the I/O unit 8, is also connected to the gate pulse generator 5, the switch unit 2, the switching transistor unit 3 and the electromagnetic switch PSR. Machining conditions such as ON time and OFF time of the gate pulse signal GATE are set in the NC device 10. The NC device 10 provides signals representative of set ON time and OFF time of the gate pulse signal GATE to the gate pulse generator 5. A faulty transistor detection circuit 6 is provided for determining if any switching transistor units have failed. Output signals NGS1, NGS2 and NGS3 of the faulty transistor detection circuit 6 are supplied to the switch controlling circuit 7 through the Input/Output (I/O) unit 8. The switch controlling circuit 7 is connected to the switch unit 2 and the switching transistor unit 3 through the Input/Output (I/O) unit 8. The switch controlling circuit 7 may be a functional part of the NC device 10 and the switch unit 2 and switching transistor unit 3 may be software controlled.

Figure 2:
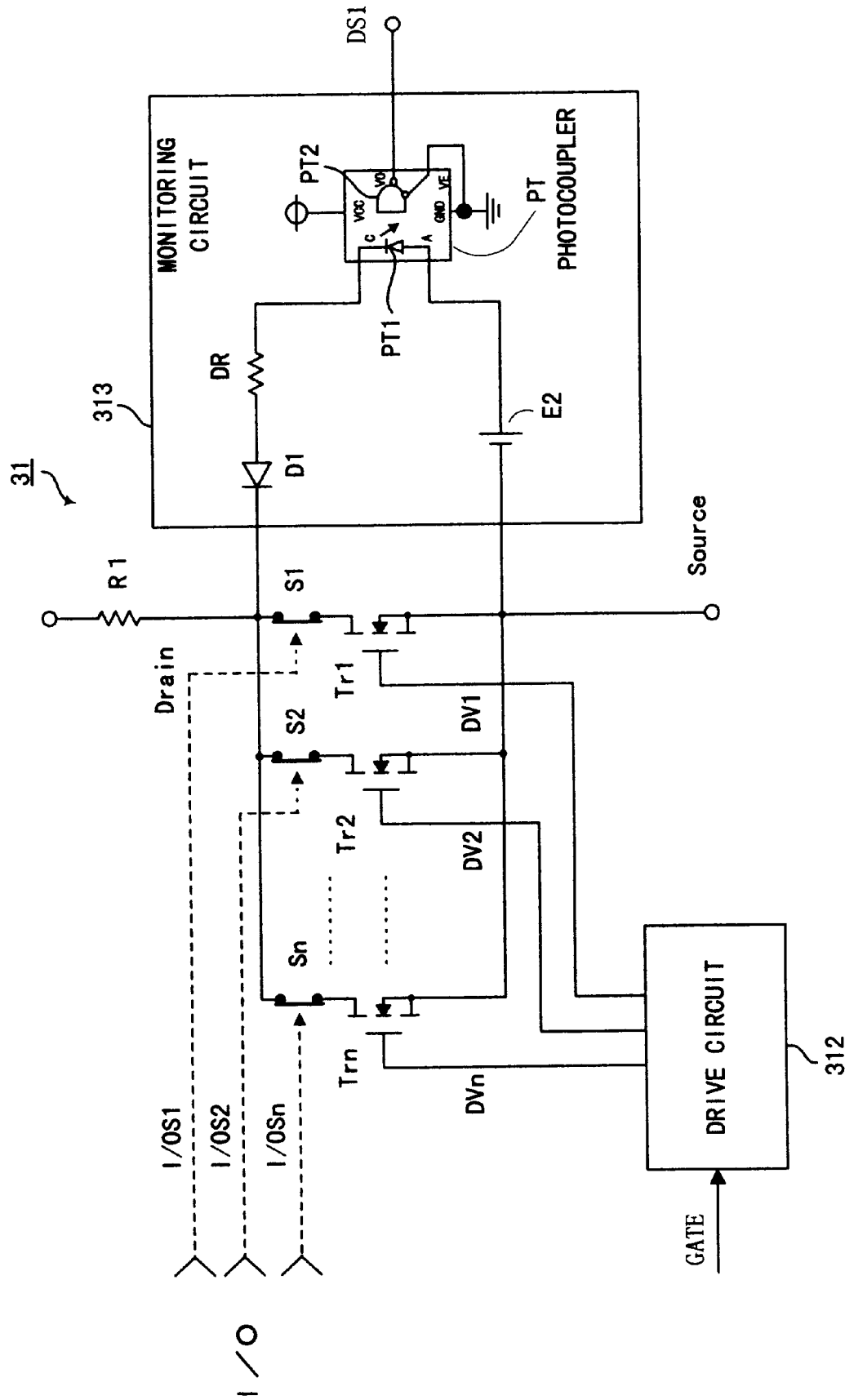
FIG. 2 is a schematic circuit diagram illustrating the switching transistor unit in FIG. 1.

The switching transistor circuit 31 will now be described in detail with reference to FIG. 2.

The switching transistor circuit 31 typically includes a number of series combinations of MOS-FET type transistors Tr1, Tr2, ... Trn and switches S1, S2, ... Sn, which are connected in parallel between a drain terminal and source terminal of the switching transistor circuit 31. The number of series combinations depends on a magnitude of current which is intended to flow through each of the transistors. A drive circuit 312, responsive to a gate pulse signal GATE, supplies drive signals DV1, DV2, ... DVn to the transistors Tr1, Tr2, ... Trn, respectively. The switches S1, S2, ... Sn operate in response to control signals I/OS1, I/OS2, ... I/Osn from the switch controlling circuit 7. A monitoring circuit 313, in which small monitoring current flows when any one or more transistors Tr1, Tr2, ... Trn are in a conducting state, produces a detection signal DS1 representative of conducting/non-conducting state of the switching transistor circuit 31. The monitoring circuit 313 comprises, for example, a 5V, d.c. power supply E2, the output voltage of which is applied to the transistors Tr1, Tr2, ... Trn through a light-emitting diode PT1 of a photocoupler PT, a resistor DR and a reverse current preventing diode D1. When the energized light-emitting diode PT1 emits light, a photodetector PT2 converts the light signal into an electric signal DS1.

The other switching transistor circuits 32, 33 preferably have the same structure as the switching transistor circuit 31.

Figure 3:
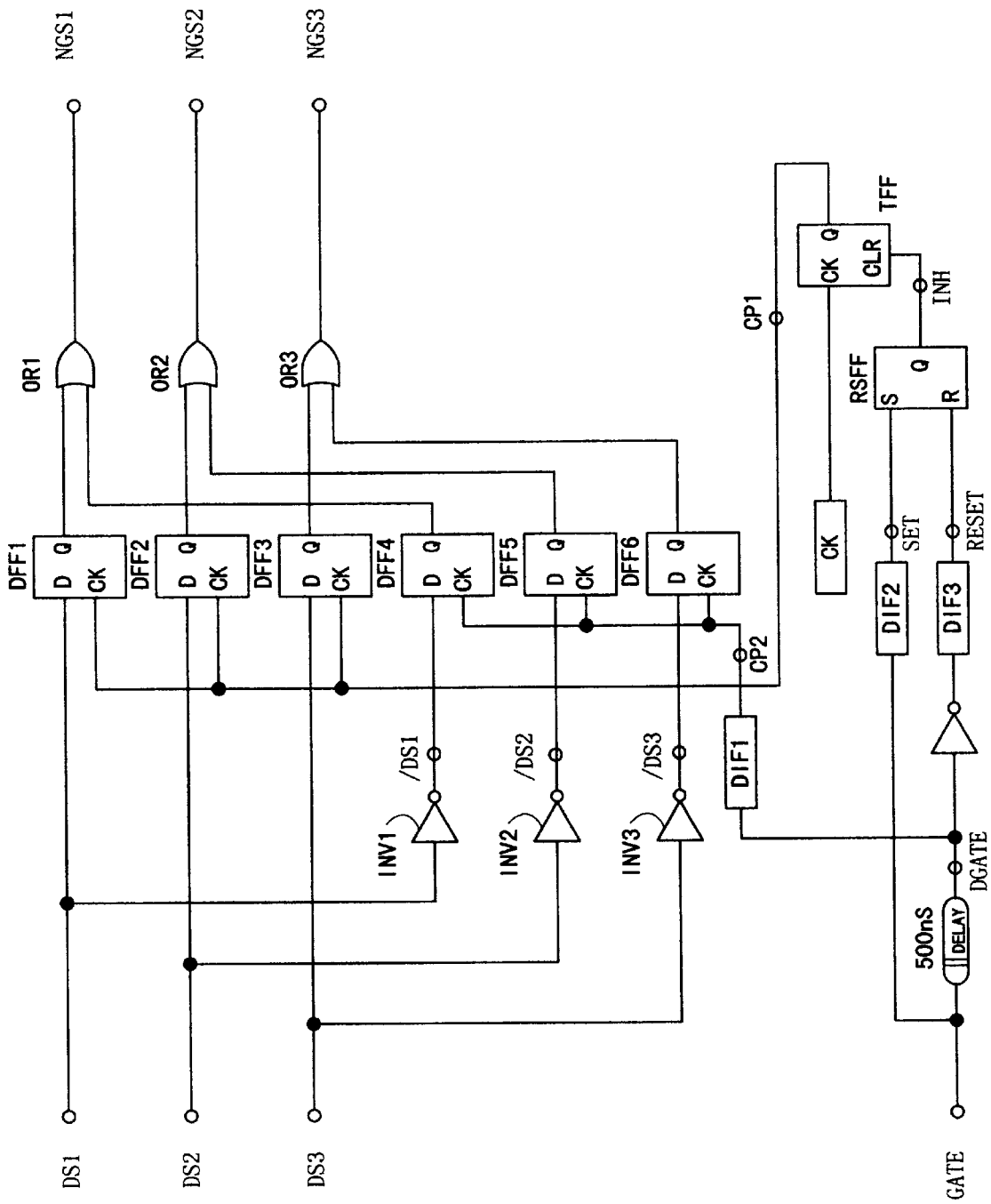
FIG. 3 is a schematic circuit diagram illustrating the faulty transistor detection circuit in FIG. 1.

The faulty transistor detection circuit 6 will now be described in detail with reference to FIG. 3.

The faulty transistor detection circuit 6 comprises three D-flip-flops DFF1, DFF2 and DFF3 each of which receive at its respective D input the output signals DS1, DS2 and DS3 of the switching transistor circuit 31, 32 and 33 respectively. The signals DS1, DS2 and DS3 are supplied to respective inverters INV1, INV2 and INV3 the output signals of which /DS1, /DS2 and /DS3 are received by three D-flip-flops DFF4, DFF5 and DFF6 at their D inputs. The gate pulse signal GATE is supplied to an one-shot multivibrator DIF2 and a delay element DELAY. The one-shot multivibrator DIF2 differentiates a rising edge of the signal GATE and its output signal SET is received by an R-S flip-flip RSFF at its input. The delay element DELAY, produces an output signal DGATE which is a signal delayed by 500 ns with respect to the signal GATE. The signal DGATE is supplied, via a inverter INV4, to an one-shot multivibrator DIF3. The one-shot multivibrator DIF3 differentiates a descending edge of the signal DGATE and its output signal RESET is received by the RS flip-flip RSFF at its R input. Output signal INH of the RS flip-flip RSFF is received by a T-flip-flop TFF at its CLR input. The T-flip-flop TFF produces a train of clock signals CP1 of 10 MHz during time when the signal INH is low. The D-flip-flops DFF1, DFF2 and DFF3 acquire the state of the signals DS1, DS2 and DS3 respectively at their D inputs each time the clock signal CP1 is applied to its respective CK input and maintains that state at its Q output until the application of the next clock signal CP1. The signal DGATE is supplied to a one-shot multivibrator DIF1. The one-shot multivibrator DIF1 differentiates a rising edge of the signal DGATE and its output clock signal CP2 is received by each of the D-flip-flops DFF4, DFF5 and DFF6 at its CK input. An OR gate OR1 receives output signals from the D-flip-flops, DFF1 and DFF4 and provides an output signal NGS1. The OR gate OR2 receives the output signals from the D-flip-flops DFF2 and DFF5 and the OR gate OR3 receives the output signals from the D-flip-flops DFF3 and DFF6. The OR gates OR2 and OR3 provide the respective output signals NGS2 and NGS3.

The operation of the faulty transistor detection circuit 6 during machining using the apparatus of FIG. 1 will now be described with reference to the timing diagrams of FIGS. 4A to 4K.

Assume that the switch CD1 in FIG. 1 is closed so that only the switching transistor 31 is connected to the d.c. power supply 1.

Figure 4:
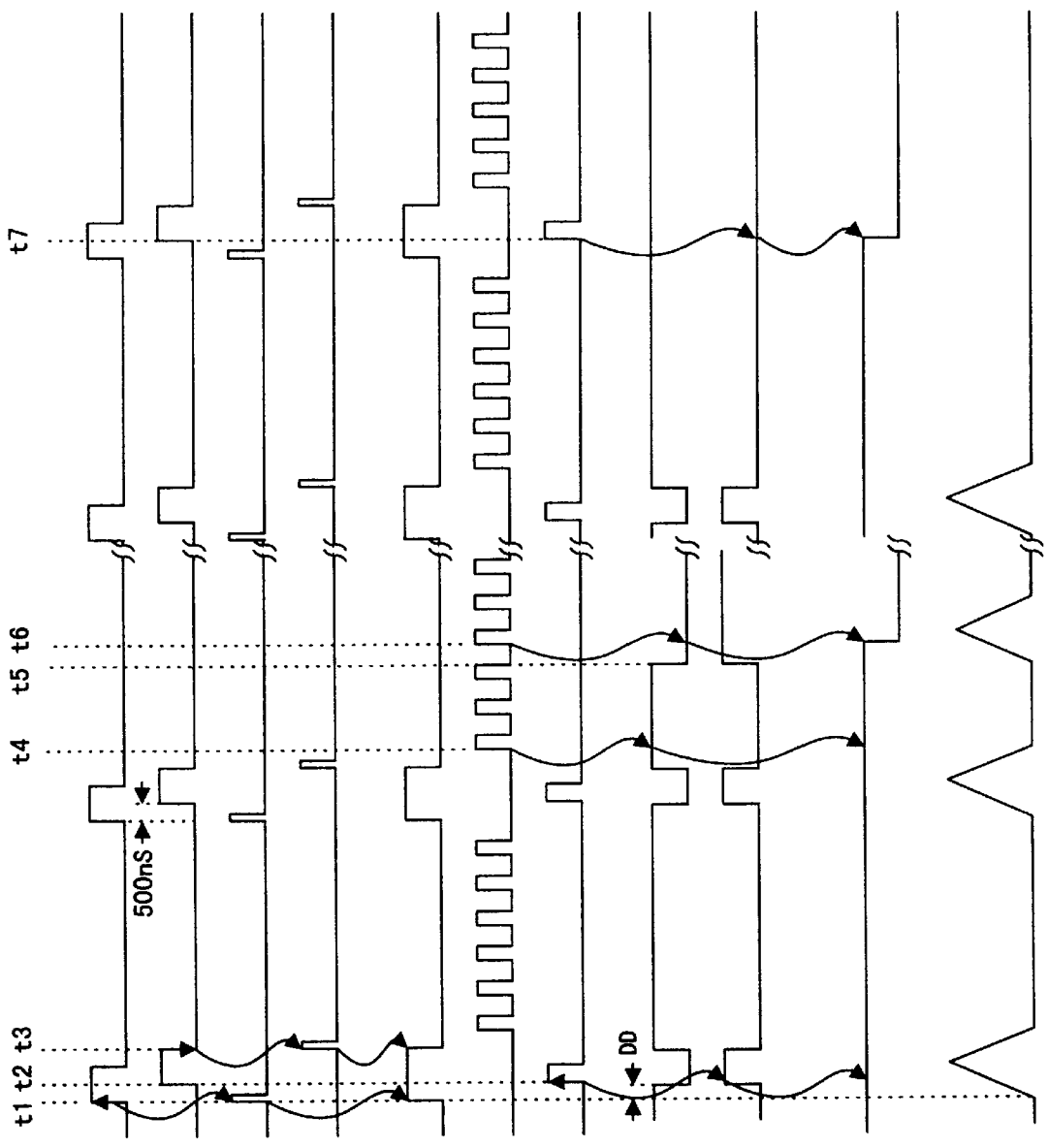
FIGS. 4A to 4K are time charts depicting the operation of the faulty transistor detection circuit in FIG. 3.

At time t1 when the gate pulse signal GATE goes high, the R-S flip-flip RSFF receives the signal SET at its S input and the output signal INH goes high, as illustrated in FIGS. 4A, 4C and 4E. In addition, current SOURCE starts to flow from a source terminal of the switching transistor circuit 31 in FIG. 2 to the machining gap 4, as illustrated in FIG. 4K.

After the lapse of the time delay DD required for detecting the flow of monitoring current through the photocoupler PT, the detection signal DS1 goes low and the output signal /DS1 of the inverter INV1 goes high, as illustrated in FIGS. 4I and 4H. Recognition of the time delay DD leads to the set time in the delay element DELAY, e.g., 500 nS. At time t2 when the delayed signal DGATE of the delay element DELAY goes high, the output clock signal CP2 of the one-shot multivibrator DIF1 is applied to the CK input of the D-flip-flop DFF4, as illustrated in FIGS. 4B and 4G. The signal CP2 checks the conduction state of the switching transistor circuit 31 during the time when the gate pulse signal GATE is high. At time t3 when the delayed signal DGATE goes low, the R-S flip-flip RSFF receives the signal RESET at its R input, as illustrated in FIGS. 4B and 4D. During the period from time t1 to t3, the T flip-flop TFF receives the signal INH at its high level at its CLR input, and the output signal of the D flip-flop DFF1 remains high. When the signal INH is low, for example at time t4, a series of clock pulses CP1 are applied to the CK input of the D flip-flop DFF4. The clock pulses CP1 check the non-conducting state of the switching transistor circuit 31 when the gate pulse signal GATE is low.

At time t5, if current SOURCE starts to flow, even though the gate pulse signal GATE is low, due to one or more faulty transistors in the switching transistor circuit 31, the signal DS1 goes low. When a clock pulse CP1 is applied to the CK input of the D-flip-flop DFF4 at time t6, the signal NGS1 goes low and maintains the low level. When, at the time t6, the switch controlling circuit 7 receives the low level of the signal NGS1, it immediately opens the switch CD1 to prevent overcurrent through the machining gap 4. In most cases when a MOS-FET fails, it undesirably turns to the conduction state resulting in the flow of overcurrent through the machining gap 4, which in turn may damage the workpiece being machined. In the embodiment illustrated in FIG. 2, the monitoring circuit 313 will detect this undesirable conduction state of even one of transistors Tr1, Tr2, ... Trn.

Further, when the switching transistor circuit 31 is in the non-conducting state though the gate pulse signal GATE is high, the faulty transistor detection circuit 6 concludes that the switching transistor circuit 31 has failed. For example, at time t7, when the clock signal CP2 is applied to CK input of the D flip-flop DFF4 and the signal /DS1 is low, the signal NGS1 goes low and stays at the low level. A previous overcurrent, for example, due to an undesirable conducting state at the time t6, is a possible cause of the undesirable non-conducting state of the switching transistor circuit 31 at the time t7. In this case, a new problem does not arise a the time t7 because the switching transistor circuit 31 has been cut off. Another possible cause is an incorrect transmission of the gate pulse signal GATE from the gate pulse generator 5 to the drive circuit 312. Only one monitoring circuit 313 is needed to detect such an incorrect transmission of the gate pulse signal GATE.

Referring back to FIG. 1, when the signal NGS1, having a low level, is sent to the switch controlling circuit 7, the switch controlling circuit 7 immediately supplies control signals to the Input/Output (I/O) unit 8 to open the switch CD1 and close one of switches CD2 and CD3 which are associated with the spare switching transistor circuits 32 and 33. In addition, the switch controlling circuit 7 may request the NC device 10 to alert the operator. Preferable switches CD1, CD2 and CD3 are thyristors or insulated gate bipolar transistors (IGBT) because their high-speed switching action help prevent the flow of overcurrent through the machining gap 4.

Figure 5:
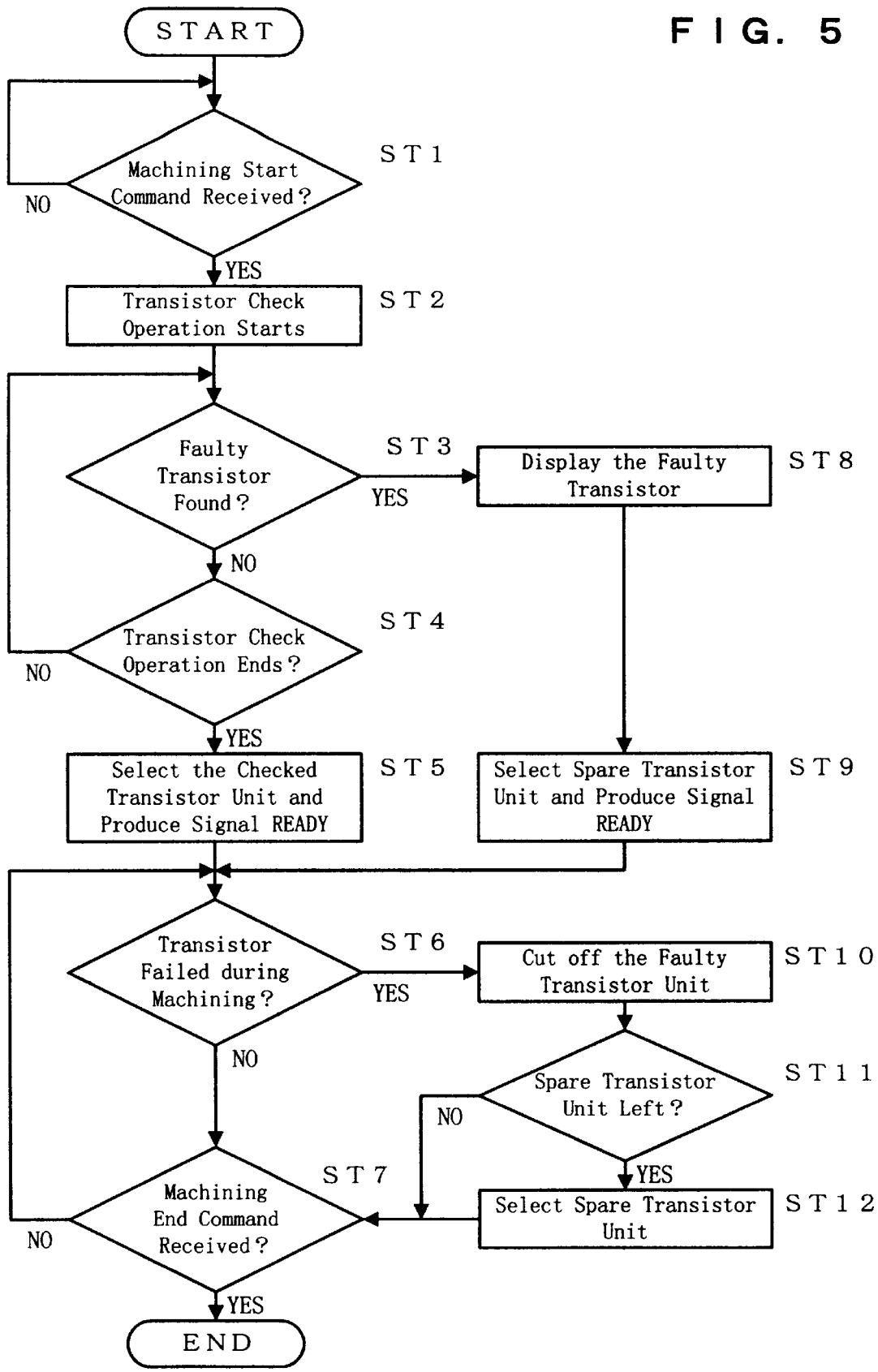
FIG. 5 is a flow chart depicting the operation of the switch controlling circuit in FIG. 1.

Referring now to FIG. 5, the operation of the switch controlling circuit 7 will be described in detail.

If, at step ST1, it is determined that a machining start command signal from the NC device 10 has been received, the process flow continues to step ST2 where, in preparation for electrical discharge machining, the switch controlling circuit 7 starts to check each transistor of the switching transistor circuit to be used as follows.

First, the switch controlling circuit 7 supplies control signals I/OS1, I/OS2, ... I/OSn through the Input/Output (I/O) unit 8 to close all switches S1, S2, ... Sn of switching transistor circuit 31. Second, the switch controlling circuit 7 closes only a switch Si of the switching transistor circuit 31. Third, the switch controlling circuit 7 instructs the gate pulse generator 5 to generate the gate pulse signal GATE having the ON time and OFF time set in the NC device 10, and checks a transistor Tr1 for a predetermined period of time, referring to the signal NGS1. At this time the electromagnetic switch PSR is open. In the same manner, the switch controlling circuit 7 checks other transistors Tr2, ... Trn one by one.

At step ST3 the switch controlling circuit 7 determines if any faulty transistors have been found. If at the step ST3 it is determined that no faulty transistors have been found during the checking operation for transistors Tr1, Tr2, ... Trn checking ends at step ST4, and the process flow continues to step ST5.

At step ST5, the switch controlling circuit 7 closes the switch CD1 and the switches S1, S2, ... Sn and produces a signal READY to the NC device 10. The NC device 10, responsive to the signal READY, starts electrical discharge machining while closing the electromagnetic switch PSR. After the step ST5, the flow continues to step ST6.

If, at the step ST3, it is determined that a faulty transistor has been found, then at step ST8 the switch controlling circuit 7 requests the NC device 10 to alert the operator specifying the faulty transistor on the display device 9. If the operator decides to forgo commencement of machining in favor of a repair of the faulty transistor and gives a machining end command to the NC device 10, the process flow ends. Otherwise the process flow continues to step ST9 where the switch controlling circuit 7 closes one of the switches CD2 and CD3 to select one of spare switching transistor circuits and produces a signal READY to the NC device 10. The NC device 10, responsive to the signal READY, starts electrical discharge machining while closing the electromagnetic switch PSR. After step ST5, the process flow continues to step ST6.

If, at the step ST6, the switch controlling circuit 7 is not informed of a failure of a transistor being used during machining until it receives a machining end command from the NC device 10 at step ST7, the process flow ends.

If, at the step ST6, the switch controlling circuit 7 is informed that a transistor circuit being used has failed during machining, it immediately instructs the switch unit 2 to cut off the faulty switching transistor circuit at step ST10. If, at step ST11, any spare switching transistor circuit are left, then at step ST12 the switch controlling circuit 7 closes one of the switches CD2 and CD3 to select one of spare switching transistor circuits for further machining.

The foregoing description of preferred embodiments of the invention have been presented for purposes of illustration and description. It is not intended to be exhaustive or to limit the invention to the precise form enclosed, and obviously many modifications and variations are possible in light of the above teaching. It is intended that the scope of the invention be defined by the claims appended hereto.

What is claimed is:

1. An electric discharge machining apparatus for machining a workpiece by supplying a series of voltage pulses to a machining gap formed between the workpiece being machined and a tool electrode, said apparatus comprising:
   a machining power supply for applying a voltage to the machining gap;
   a switching transistor connected between the machining power supply and the machining gap for pulsing an output voltage of the machining power supply;
   a gate pulse generator for generating a gate pulse signal having an ON time and an OFF time to control an on/off switching operation of the switching transistor whereby the switching transistor is in a non-conducting state when the gate pulse signal is OFF;
   a monitoring power supply monitoring circuit connected in parallel with the switching transistor, and;
   a faulty transistor detection circuit for determining if the switching transistor has failed by determining if current flows from the power supply monitoring circuit through the switching transistor when the gate pulse signal is OFF.

2. An electric discharge machining apparatus for machining a workpiece by supplying a series of voltage pulses to a machining gap formed between the workpiece and a tool electrode, said apparatus comprising:
   a machining power supply for supplying voltage to the machining gap;
   a switching transistor connected between the machining power supply and the machining gap for pulsing an output voltage of the machining power supply;
   a gate pulse generator for generating a gate pulse signal having an ON time and an OFF time to control an on/off switching operation of the switching transistor whereby the switching transistor is in a conducting state when the gate pulse signal is ON;
   a power supply monitoring circuit connected in parallel with the switching transistor, and;
   a faulty transistor detection circuit for determining if the switching transistor has failed by sensing when no current flows from the power supply monitoring circuit through the switching transistor when the gate pulse signal is ON.

3. An electric discharge machining apparatus for machining a workpiece by supplying a series of voltage pulses to a machining gap formed between the workpiece and a tool electrode, said apparatus comprising:
   a machining power supply for supplying a voltage to the machining gap;
   at least two switching transistor units;
   a switch device for selectively connecting one of the at least two switching transistor units between the machining power supply and the machining gap for pulsing an output voltage of the machining power supply;
   a faulty transistor detection circuit for determining if the switching transistor unit connected between the power supply and the machining gap has failed; and
   a switch controller for controlling the switch device so that if said faulty transistor detection circuit determines the connected switching transistor has failed, said connected switching transistor unit is effectively cut off and another of the at least two switching transistor units is connected between the machining power supply and the machining gap.

4. The electric discharge machining apparatus of claim 3, further comprising a gate pulse generator for generating a gate pulse signal having an ON time and an OFF time to control on/off switching operation of the at least two switching transistors whereby the switching transistor units are is a non-conducting state when the gate pulse signal is OFF, and wherein said faulty transistor detection circuit determines that the connected switching transistor unit has failed when current flows through said connected switching transistor unit when the gate pulse signal is OFF.

5. The electric discharge machining apparatus of claim 3, further comprising a gate pulse generator for generating a gate pulse signal having an ON time and an OFF time to control on/off switching operation of the at least two switching transistor units so that the switching transistor units are in conducting state when the gate pulse signal is ON, an wherein said faulty transistor detection circuit determines that the connected switching transistor unit has failed when no current flows through said connected switching transistor unit when the gate pulse signal is ON.

6. An electric discharge machining apparatus for machining a workpiece by supplying a series of voltage pulses to a machining gap formed between the workpiece and a tool electrode said apparatus comprising:
   a machining power supply for supplying a voltage to the machining gap;
   a switching transistor connected between the machining power supply and the machining gap for pulsing an output voltage of the machining power supply;
   a gate pulse generator for generating a gate pulse signal having an ON time and an OFF time to control on/off switching operation of the switching transistor so that switching transistor is in non-conducting state when the gate pulse signal is OFF, and;
   a faulty transistor detection circuit having a power supply independent of said gate pulse generator and connected to cause current to flow through said transistor when said transistor is conducting for determining if the switching transistor has failed by sensing when current flows through the switching transistor when the gate pulse signal is OFF.

* * * * *